United States Patent

Woolman

[15] 3,688,419
[45] Sept. 5, 1972

[54] PERCEPTION CONVERGENCE DEVICE FOR PAIRED LEARNING

[72] Inventor: Myron Woolman, 55 E. 86th St., New York, N.Y. 10028

[22] Filed: May 28, 1970

[21] Appl. No.: 41,257

[52] U.S. Cl. ..................35/60, 108/61, 297/157
[51] Int. Cl. ...............................A47b 41/00
[58] Field of Search....35/22 R, 35 C, 60; 273/136 Z; 312/194, 195, 196; 108/60, 61, 64; 52/27, 28, 33, 36, 171, 173, 234, 237, 238, 239; 297/157, 158, 159

[56] References Cited

UNITED STATES PATENTS

| | | | |
|---|---|---|---|
| 148,776 | 2/1948 | Fay | 33/7 |
| 175,790 | 10/1955 | McCann | 33/7 |
| 208,256 | 8/1967 | Rich | 33/11 |
| 1,463,633 | 7/1923 | Smith | 52/33 |
| 1,918,866 | 7/1933 | Reget | 273/136 Z UX |
| 2,344,149 | 3/1944 | Jory | 52/36 X |
| 2,607,085 | 8/1952 | Toulmin | 35/60 UX |
| 2,942,924 | 6/1960 | Stangert | 312/196 X |
| 3,366,415 | 1/1968 | Cooper | 35/60 UX |
| 3,452,985 | 7/1969 | D'Zmura | 108/66 X |
| 3,559,352 | 2/1971 | Magnuson | 52/36 |

FOREIGN PATENTS OR APPLICATIONS

| | | | |
|---|---|---|---|
| 958,506 | 2/1957 | Germany | 108/64 |

OTHER PUBLICATIONS

Hayes, A.S.; Language Laboratory Facilites; Hew Office of Education Bulletin 1963, No. 37, OE– 21024, p. 32

Primary Examiner—Harland S. Skogquist
Attorney—Gary L. Jordan

[57] ABSTRACT

A device and modifications thereof are disclosed to provide for converging the perception of two individuals engaged in a paired interactive, instructional program. The perception convergence device blocks external, non-programmed stimuli from the learner pair and focuses their combined perception on each other and on a program comprised of predetermined learning stimuli so that the learning stimuli and learner responses can be fully specified in order to facilitate mutually interactive paired learning. The device comprises barrier members and positioning means for each learner of said learner pair arranged in a manner to accomplish this purpose.

29 Claims, 8 Drawing Figures

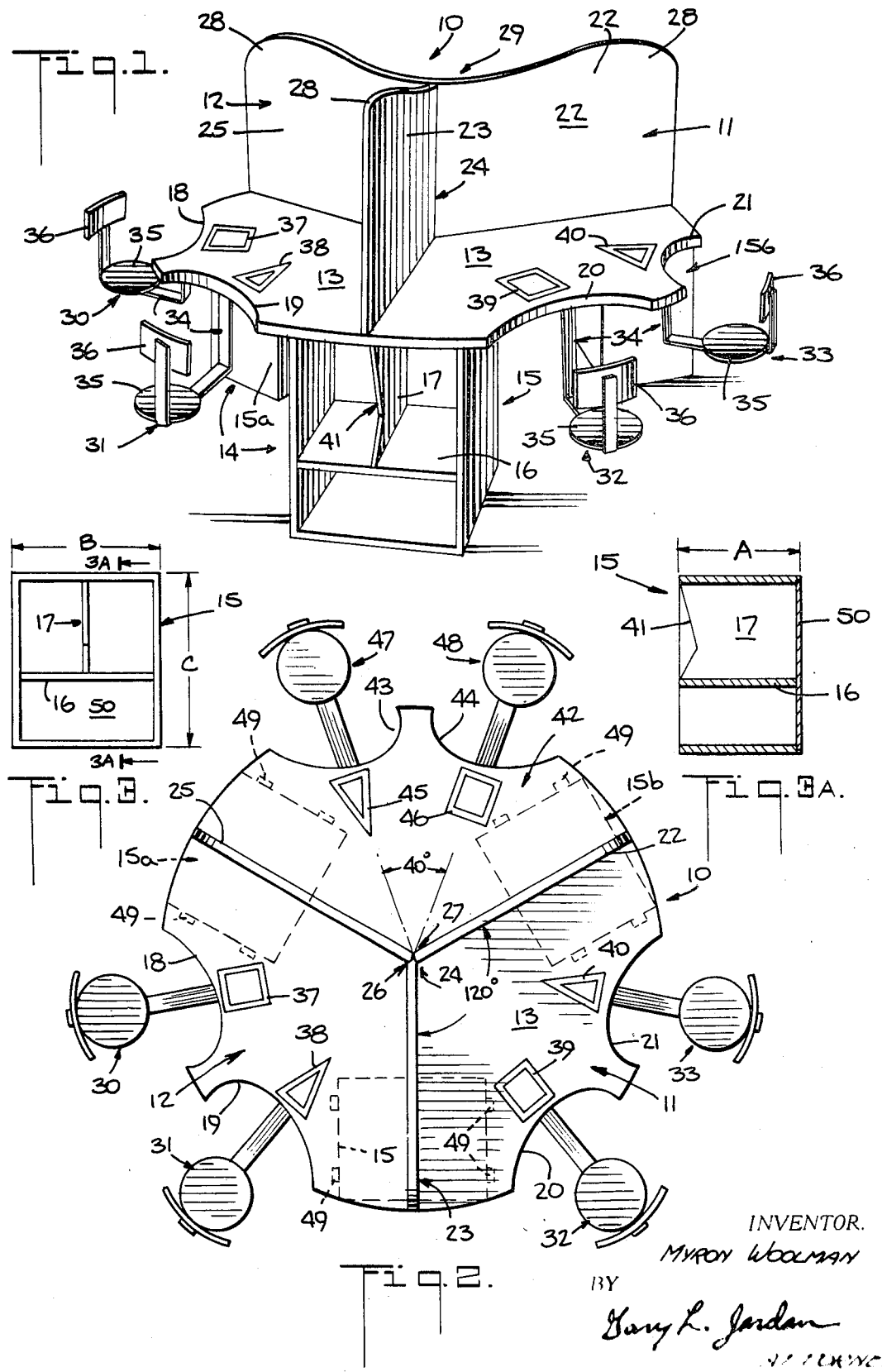

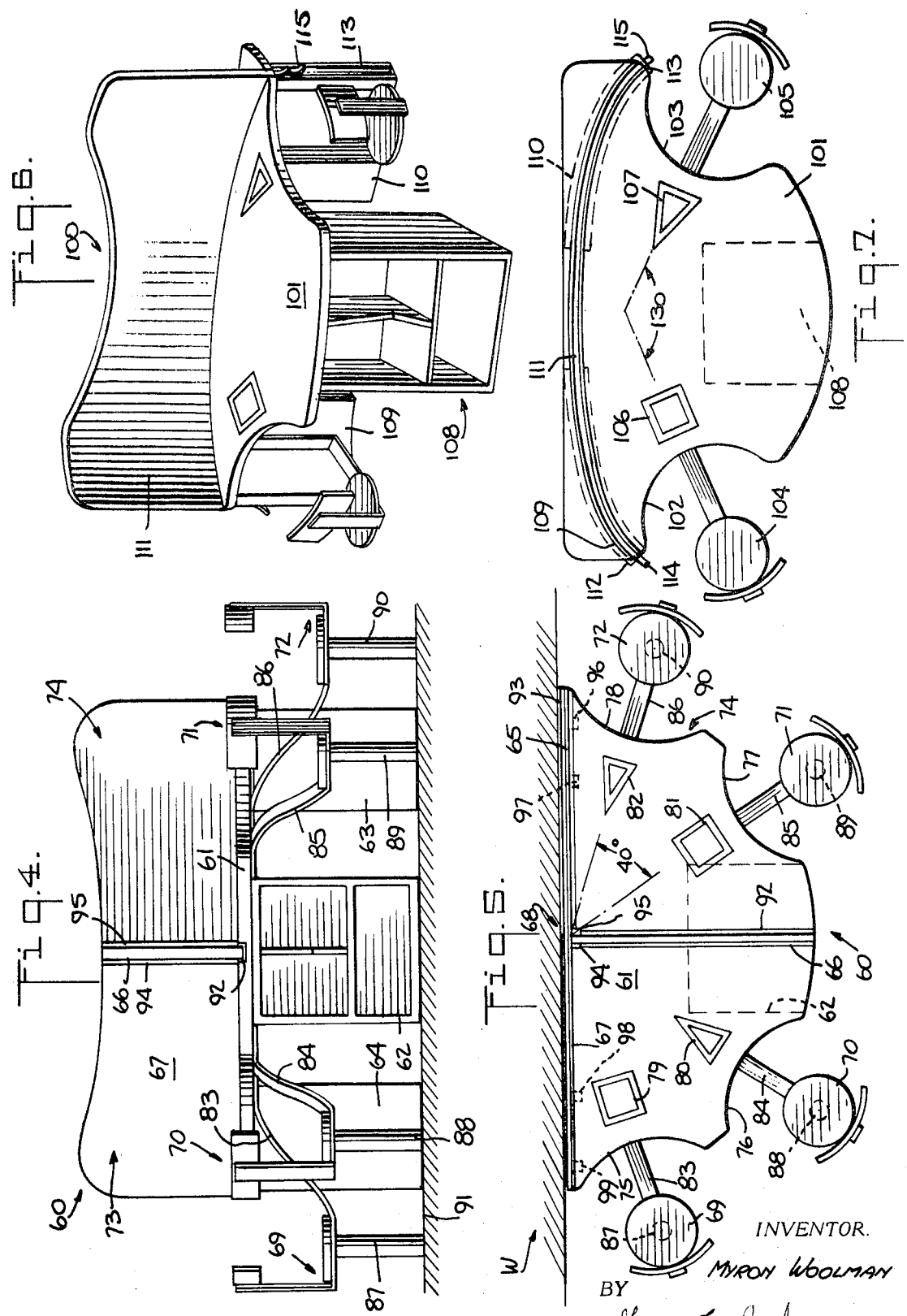

3,688,419

PERCEPTION CONVERGENCE DEVICE FOR PAIRED LEARNING

BACKGROUND OF THE INVENTION

This invention relates to a perception convergence device to facilitate mutually interactive paired learning. More specifically, it relates to a device for focusing the mutual perception of each of a pair of learners onto one another and onto a cross-synchronized stimulus field which is presented to the learner pair from a position within the device.

The device also functions to block external stimuli from the learner pair and to promote control over interactive responses between the pair of learners.

Paired learning is the term which is used herein to summarize a new operational theory of programmed instruction. According to this theory the individual human learner learns programmed instructional content more efficiently in a mutually interactive fashion both in terms of mental retention and required completion time than in the situation wherein the individual learner works his way along through a body of instructional content. This increased efficiency holds for both the situation where the individual learner is reading a textbook as well as where the individual learner is self-pacing himself through a course of programmed instruction. In practice this operational theory results in students quickly becoming motivated by mutually interactive paired learning with their respective partners and thus overcoming the frequently observed boredom syndrome associated with highly individualized learning routines. In addition, this new paired learning operational theory presents a number of additional advantages over conventional individualized instruction. Primary among these advantages is that language learning is greatly facilitated by a paired learning context since language is fundamentally a didactic process requiring at least two persons. This greater efficiency in language learning holds for all language learning situation including the initial learning of a single language, the learning of a second language, and the learning of various levels of specialized technical languages. The second advantage is that in a paired learning context the social interaction skills of the students are greatly enhanced. The students, due to the fact that they are continually working with another student, rapidly increase their level of social interaction and since the learners may be rotated into and out of various paired situations the classroom of learners rapidly generates a micro-society in which mastery of the presented instructional content with another student permits the development of new roles such as monitor and evaluator which is a status generating activity within the micro-society of the classroom.

Another benefit offered by the paired learning theory is that in this context the number of responses made by the learner pair to the programmed course content is much higher than in the traditional stand-up teacher classroom wherein students only occasionally make learning responses. The increased response rate and the absence of boredom due to required social interactions with the other learner of the pair result in greater willingness to maintain involvement in learning tasks until a learning goal has been reached and also increases the feelings of satisfaction in having achieved those goals. These advantages allow the classroom to become a major life situation for all learners rather than just of primary importance to the few highly motivated learners who respond to the teacher in conventional classrooms. In such a micro-society as is generated by paired learning no student can operate in a behavioral pattern of non-response and, therefore, reduced learning efficiency.

The prior art shows a number of devices for excluding external stimuli from single learners. U.S. Pat. No. 3,233,346 to Cornberg shows a learning carrel wherein individual learners are placed into paneled cubicles in order to individually concentrate on a prepared program of audio-visual instructional material. This is similar to u.s. Pat. No. 3,160,451 to Lewis entitled "Independent Study Center Construction" wherein a number of individual work spaces are provided. U.S. Pat. No. 3,162,959 to Woolman is another, more advanced form of an individualized instructional device. The art has not developed devices for converging meaningful perceptions by a pair of learners on stimuli which are jointly perceived in a field of stimuli which is common to only that pair of learners since the heretofore overwhelming emphasis has been on individual instruction of either the traditional stand-up teacher form or the programmed form.

The prior art individual programmed instruction involves a learner using a programmed text or machine so that the learner responds directly and individually to the materials. Following each response, he alone has an opportunity to ascertain the correctness or incorrectness of his response. Individual programmed instruction is solipsistic and involves the interaction of an individual with an object in the form of a text or vehicle for carrying information and accepting his responses and providing feedback for his use. This form of instruction is an efficient tool for insuring that learners can produce responses within instructional content areas. However, it eliminates the many benefits which can be derived both motivationally and instructionally by working with another human being in a common learning experience. The paired learning program or system permits learners to work on the same material so that the responses of each are made more accurate and more reliable by the information and skills of the other. This joint and mutual reciprocating effort differs in kind and in outcome from anything possible in the prior art covered by individual instructional programmed texts or machines.

In order to set up a paired learning situation, it is necessary to provide a cross-synchronized learning system. This consists of the following elements:

1. The placement of the learners at a device which facilitates the convergence of the two learners' perceptions so that they can perceive each other's work and work separately or together at different and predesignated points in time;
2. Materials to present a cross-synchronized field of stimulus so designed that each learner knows when to perform work directly on the cross-synchronized program, when to ask questions and/or give particular kinds of responses, when to switch work products for cross-checking each other's work at predesignated points and when to obtain an evaluation of the joint products of his learner pair by evaluators at appropriate times.

The arrangement of the cross-synchronized learning system and the designation of types and extents of the responses to the instructional content in the cross-synchronized field of stimulus is such as to control and limit the responses the learner pair make to only those which are made in a mutual and reciprocal manner.

Intrinsic to the learning activity in a paired learning programmed system is the fact that for part of the time, each learner is responding to the work of the other rather than merely making continuous responses to a program designed for individual use. Thus each learner works in a complementary cross-synchronized program so designed that the work of each is supportive to the work of the other to insure the adequacy of learning outcomes. This type of response, i.e., responding to the responses previously made by one's learner partner, is not possible in the prior art individualized programmed instruction.

In view of the above it is an object of the present invention to provide a perception and response convergence device to facilitate mutually interactive paired learning by providing a means to focus the perception of each of the learners of a learner pair on one another and on a cross-synchronized stimulus field which is common to only that pair of learners in order to fully specify the learning stimuli to said learner pair and to block external stimuli from said learner pair and to permit learners to respond in a synchronous and complementary manner to said stimuli.

Another object of this invention is to provide a perception convergence device wherein barrier members are provided for converging the perception of the learner pair onto one another and onto a cross-synchronized stimulus field provided for within said device and for blocking external stimuli from said learner pair and promoting control over interactive responses between the pair of learners.

Yet another object is to provide a device to facilitate mutually interactive paired learning by at least one learner pair wherein a work space for that learner pair is provided and wherein the work space contains means to accommodate a cross-synchronized stimulus field which is common to said learner pair and wherein said device contains a perception convergence means of the above referred to type.

Another object of this invention is to provide modifications of the first described preferred form of the invention whereby various numbers of learner pairs are provided for.

Yet another object of this invention is to provide learner positioning means for controlling the relative positions of each of said learners of said learner pair with respect to each other as well as with respect to other learner pairs so as to facilitate cross-synchronized responses to each other's programmed materials.

Another object of the present invention is to provide a positional indicator for each learner of said learner pair which is located on a portion of said perception convergence device whereby each learner of said learner pair has an indication of the position which he should occupy with respect to the other learner of said learner pair, in order to carry out cross-synchronized learning activities in the paired learning system.

These and other objects and advantages of this invention will become apparent from the following description and claims. The invention can best be understood by reference to the accompanying drawings illustrating several embodiments of the present invention.

DESCRIPTION OF THE DRAWINGS

FIG. 1 is a perspective view of the preferred embodiment of the perception convergence device of the present invention;

FIG. 2 is a plan view of the device of FIG. 1;

FIG. 3 is a front view of the support means for the device shown in FIG. 1;

FIG. 3A is a side sectional view of the support means shown in FIG. 3;

FIG. 4 is a front view of a first modification of the device shown in FIG. 1;

FIG. 5 is a plan view of the device illustrated in FIG. 4;

FIG. 6 is a perspective view of a second modification of the device shown in FIG. 1; and FIG. 7 is a plan view of the modification illustrated in FIG. 6.

PREFERRED EMBODIMENT

FIGS. 1 and 2 illustrate a perception convergence device 10 which is designated to accommodate three pairs of learners. In FIG. 1 a first work space 11 and a second work space 12 for two different pairs of learners are illustrated. A substantially horizontal barrier member 13 defines the lowermost boundary of work spaces 11 and 12 and is supported by support means 14 which consists of three support boxes 15, 15a and 15b. The substantially circular configuration of barrier member 13 is shown in FIG. 2. As shown in FIG. 1 at least one of the support boxes, illustrated by box 15, contains therein a shelf 16 and a shelf divider 17, which in the position shown provides a material storage means for device 10. If desired all three of the support boxes can have shelves and/or dividers therein.

Positioning indentations 18 and 19 are formed in horizontal barrier member 13 and are shaped in a mutually converging manner as shown in FIG. 2 in order to provide positioning means for each learner of the learner pair when they use work space 12. The converging shape of the indentations serves to better focus the mutual perceptions of the learners on each other's work and on the cross-synchronized stimulus field. In a similar manner positioning indentations 20 and 21 are formed in horizontal barrier member 13 to provide positioning means for each of the learners when using work space 11. In addition to functioning as positioning means for each learner pair, these indentations allow each pair to be seated closer to the center of member 13 so as to increase the convergence of their mutual perception directly toward the rear areas of each of the work spaces.

A first upright barrier panel 22 rests on and is connected to the top surface of horizontal barrier member 13 in a perpendicular manner and extends from the outer edge thereof to the central portion thereof as shown in FIGS. 1 and 2. A second upright barrier panel 23 rests on and is connected to the top surface of horizontal barrier member 13 in a perpendicular manner and extends from the outer edge thereof to the central portion in a similar fashion as described for panel 22. Panels 22 and 23 are connected one to another by the inner edges thereof over the center of horizontal barrier member 13 along a common connection line 24. In a like fashion upright barrier panel 25 is connected to horizontal barrier member 13 and extends from the outer edge thereof into the central portion of said member where it is connected to the inside edges of upright panels 22 and 23 along connection lines 26 and 27 as shown in FIG. 2. The convergence of panels 22, 23 and 25 over the central portion of member 13 forms the wedge-shaped work areas 11 and 12.

As shown in FIG. 1 each of the upright barrier panels 22, 23 and 25 have a raised outer portion 28 and a lower interior portion 29. The lower internal portion 29 allows the teacher to more easily see all three pairs of learners from any position around the periphery of device 10, but the substantial height of the upright panels over the central portion of horizontal barrier member 13 prevents the learner pairs working in the work spaces from receiving extraneous external stimuli from the other learner pairs working at said device. The connections of panels 22, 23 and 25 over the center portion of members 13 form V-shaped inner edges located on connection lines 24, 26 and 27 as shown in FIG. 2.

As shown in FIG. 1 a series of learner seats 30, 31, 32 and 33 are provided at each of the indentations 18, 19, 20 and 21, respectively. Each learner seat is comprised of a seat support arm 34 which is shown as a right angle bracket support, a horizontal seat bottom 35 and a backrest 36. In this manner, learner seats are provided in a registered fashion with respect to each of the positioning indentations so that each learner in each of the learner pairs has his position with respect to his partner specified. Each of the learners of each of the learner pairs working at device 10 has his perceptions focused on the other learner of his pair and on a cross-synchronized field of stimulus which can be presented within each of the work spaces. Additionally, position indicators 37, 38, 39 and 40 are provided for each of learner seats 30, 31, 32 and 33, respectively. These position indicators serve to differentiate each of the learner positions for each of the learner pairs so that the responses of each learner in the pair to the cross-synchronized field of stimulus presented in the programmed instruction can be predetermined according to the operational theory of paired learning.

In FIG. 1, shelf divider 17 is provided with a front notch 41 which allows the student sitting in seat 31 to obtain a better view of and access to both the right- and left-hand compartments in box 15 while allowing the student in seat 32 to also have similar visual and manual accessibility to any material stored in box 15.

Referring now to FIG. 2, work space 42 which contains indentations 43 and 44 is shown in relationship to work spaces 11 and 12. Horizontal barrier member 13 is shown being supported by boxes 15, 15a and 15b (shown in dotted lines) which form the support means 14 for device 10. Also shown are position indicators 37, 38, 39 and 40 as above described, as well as position indicators 45 and 46 which are registered with indentations 43 and 44 of work space 42. The relationships between each of the pairs of seats 30, 31, 32, 33, 47 and 48 and their respective indentations and position indicators can be seen along with the relationship to the upright barrier panels 22, 23 and 25. As illustrated, this equidistant relationship is such that each of the work spaces 11, 12 and 42 are contained within an angle of approximately 120° which angle is defined by the adjacent upright barrier panels. Within each work space the three elements of a seat, a positioning indentation and a position indicator is provided for each learner in each of the learner pairs. The center of the learner seat, the mid-portion of the positioning indentation and the position indicator for each of the learners forms a positioning axis. Within each work space the two positioning axes so defined intersect at an angle of approximately 40° as shown. Considerable latitude is possible in the angle defined by the intersection of these positioning axes up to approximately the angle defined by the intersecting upright panels (120°) with the provision that the support means 14 be adequately modified to allow such variation since more leg space for the learner pair is needed in this variation.

As shown in FIG. 2, brackets 49 (shown by dotted lines) are provided on the undersurface of horizontal barrier member 13 in order to secure support means 14 to the undersurface thereof. Four of such brackets are provided for each of boxes 15, 15a and 15b. A securing means between the brackets and the boxes may be any conventional type such as screws, toggle devices or clips. In a similar manner, the seat support arms 34 for each of the learner seats may be connected to the undersurface of horizontal barrier member 13 by screws, bolts, clamps, brackets or gluing means. Since the weight of a learner is exerted on each of the learner seats, the seat support arms 34 must be constructed of a high-strength material such as steel or high-strength wood laminates.

Referring now to work space 11 of FIG. 2, the perception convergence means illustrated by upright barrier panels 22 and 23 function to converge the perception of the learner pair as do the positioning means illustrated by the learner seats 32 and 33, the positioning indentations 20 and 21, and the position indicators 39 and 40. For greatest efficiency in converging the perception of the learner pair on a common cross-synchronized field of stimuli, all of the positioning means above described should be present as part of device 10, but it is possible to use only the perception convergence means without the positioning means. When used, the positioning means cooperates with the upright barrier panels to increase the efficiency of converging the perception of the learner pair.

Referring now to FIG. 3, a detail view of the support box 15 partially illustrated in FIG. 1, is shown with shelf 16 and shelf divider 17 shown in plan view. Box bottom 50 is also shown in plan view. FIG. 3A shows a sectional view of FIG. 3 taken along the line 3A—3A which shows notch 41 and shelf divider 17 and box bottom 50. As shown in FIGS. 3 and 3A, the dimensions of the box 15 are represented by the symbols A, B and C. Each of these dimensions is different in order to provide a vertical adjustment or elevation means for horizontal barrier member 13. For example, when children of ages 3–4 are to use device 10, boxes 15, 15a and 15b would be mounted with dimension A in the vertical position in order to provide support means for horizontal barrier member 13. When the children reach age 4 the boxes would be changed to position B and when they reached 6 years old, the boxes would be mounted with dimension C in the horizontal position as shown in FIG. 1. When the boxes are mounted with dimension A in the vertical position, there is no material storage means available, however, when the box is mounted with dimension B in the vertical position, shelf divider 17 may be used as a shelf and shelf 16 then becomes a shelf divider. In this manner, by providing the support means with a vertical adjustment or elevational capability, the support means 14 represents a vertical adjustment means for holding horizontal barrier member 13 in raised and lowered vertical positions to accommodate for learners of different sizes and ages.

MODIFICATIONS OF PREFERRED EMBODIMENT

Referring now to FIGS. 4 and 5, a first modification of the above-described perception convergence device 10 is illustrated as perception convergence device 60 which is designed to accommodate two learner pairs. A horizontal barrier member 61 is supported by a first support means 62 and support panels 63 and 64. The first support means 62 consists of a support box of the same configuration as previously described with respect to FIGS. 3 and 3A. Upright barrier panels 65, 66 and 67 are arranged in a similar fashion to the corresponding upright barrier panels described with regard to FIG. 1. FIG. 5 shows the generally semicircular nature of horizontal barrier member 61 and the arrangement of the upright barrier panels thereon. Each of these panels extends from the outer edge of the semicircular barrier member 61 along the diameter thereof to a centrally located portion 68. A series of learner seats 69, 70, 71 and 72 are positioned in pairs associated with each of the work spaces 73 and 74 which are defined by the horizontal barrier member 61 and upright barrier panels 65, 66 and 67. Also provided are semicircular positioning indentations 75, 76, 77 and 78 which are in an aligned position with respect to position indicators 79–82 in the same fashion as described above for the preferred embodiment. First support means 62 is shown by dotted lines in FIG. 5.

In addition to providing for only two pairs of learners the modification illustrated in FIGS. 4 and 5 contains a number of additional features which may also be employed in the preferred embodiment illustrated in FIGS. 1 and 2, if desired. The first feature is that the seat support arms 83–86 are shown in FIG. 4 to be curved rather than rectilinear as illustrated in FIGS. 1 and 2. Another feature is that seat support legs 87–90 are provided for each learner seat. These support legs extend from the bottom of the learner seats to the floor line 91 in order to provide additional support for the learner seats 69–72 whereby these seat support arms 83–86 can be constructed from less structurally rigid material, such as plastic or medium-strength laminated wood. This form of the learner seats is preferred due to the improved strength and appearance.

Another feature illustrated by this embodiment is that panel tracks 92 and 93 (FIG. 5) are provided in the upper surface of horizontal barrier member 61 in order to allow removal of upright barrier panels 65 and 66. Panel support members 94 and 95 are also provided at the central rear position 68 in order to provide additional support for the movable panels 65 and 66 when in the position shown in FIG. 4. These panel support members 94 and 95 are affixed to the upper surface of barrier member 61 where shown at position 68 on either side of movable panel 66. Panel support member 95 also provides support for movable panel 93. In use, both panels 65 and 66 may be slid outwardly along the respective panel tracks 92 and 93 in order to use the perception convergence device 60 as a discussion table. In normal use, wall W furnishes additional support for the outer surface of panel 65 although a support member connected to device 60 can be used.

Another use of the movable upright barrier panels is that panel 66 may be slid approximately one-half of the way along its panel track 92 in order to form a common space in the vicinity of central position 68 in which a field of stimulus common to both of the learner pairs may be placed. In this manner, printed materials or other stimulus-presenting means can be used by both of the learner pairs for some portion of the program instruction time. Another use is that with panel 65 removed, another identical perception convergence device can be placed along the diameter of the semicircular device illustrated in FIG. 5 in order to create a circular discussion table in which two pairs of students can interact in a discussion while two additional learner pairs work on learning materials prepared for use by only a single learner pair.

Brackets 96, 97, 98 and 99 are provided for attaching support panels 63 and 64 to the undersurface of horizontal barrier member 61. First support member 62 can be attached to the undersurface of member 61 by any conventional means.

As in the preferred embodiment illustrated in FIGS. 1 and 2, the angle formed by the positioning axes defined by the learner seats, the indentations and the position indicators is 40° for each of the learner pairs as shown in FIG. 5.

Referring now to FIGS. 6 and 7, a perception convergence device 100 is shown for use by a single learning pair. A generally semicircular horizontal barrier member 101 is provided as shown in FIG. 7 with indentations 102 and 103 aligned with learner seats 104 and 105 and position indicators 106 and 107. These aligned members form positioning axes which intersect at an angle of approximately the largest size by which positioning axes can be separated in order to effectively preserve a paired learning configuration.

Horizontal barrier member 101 is supported by support member 108 which corresponds to box 15 of FIG. 1. Also provided are additional support panels 109 and 110 which are curvilinear as shown in FIG. 7. Each of these support panels 109 and 110 is hollow and accepts curved upright barrier panel 111 and provides for vertical movement of said upright panel. Panel tracks 112 and 113 are provided to guide the two sides of movable panel 111 downwardly when released by vertical adjustment means 114 and 115 which can be conventional spring biased catches which enter through slots in tracks 112 and 113 to contact the lowermost edge of panel 111 when in its raised position. These catches can also enter slots provided along the outer edges of panel 111 (not shown) to allow vertical adjustment of said panel.

Thus, curve panel 111 may be used as a perception convergence means when raised or it may be dropped and the device used in isolation from other students and external stimuli in order to facilitate mutually interactive paired learning.

As shown in FIG. 7, indentations 102 and 103 are semicircular in nature and place the learners in the learner pair close together and well into the generally semicircular area defined by the horizontal barrier member 101 to accomplish the same convergence of perceptions as described for the indentations of FIGS. 1 and 2.

The materials of construction for the devices illustrated and described above may be any rigid structural material such as metal, wood, laminated wood, plastic or reinforced glass products such as fiberglass and polyester conglomerates. The devices may be painted or surfaced with appropriate materials including melamine-formaldehyde thermoset resin products. A preferred material of construction is plywood of approximately three-quarter inch thickness wherein top and edge surfaces of the horizontal barrier member are formed from such thermoset resin and wherein the edges of the upright barrier panels have a similar stripping of resin material as finishing. These resins may be employed in various colors for providing a color-coded series of devices in any given classroom situation in order to allow students to easily distinguish the convergence devices from each other.

The above referred to cross-synchronized field of stimulus can be presented to the learner pairs through the use of specially designed workbooks or audio-visual programs wherein photographic film strips and magnetic tapes are employed for producing visual and audio information and for requesting responses of the learner pair at specific and predesignated times. The materials and/or equipment to present such a field of stimulus can be accommodated within the work spaces by placing the materials on the horizontal barrier members or by building appropriate equipment into the work space of the device.

While the invention has been described in connection with different embodiments thereof, it will be understood that it is capable of further modification, and this application is intended to cover any variations, uses or adaptions of the invention following, in general, the principles of the invention and including such departures from the present disclosure as come within the known or customary practice in the art to which the invention pertains, and as may be applied to the essential features hereinbefore set forth and as fall within the spirit and scope of the invention or the limits of the appended claims.

What is claimed is:

1. A perception convergence device to facilitate mutually interactive paired learning by at least one learner pair comprising a work space for said learner pair, said work space having means to accommodate a cross-synchronized stimulus and response control field common to said learner pair, and perception convergence means to focus the perception of each of the learners of said learner pair on a cross-synchronized stimulus field common to the learner pair in order to fully specify the learning stimuli to said learner pair and to exercise control over interactive responses, said perception convergence means partially defining said work space and focusing the perceptions of the learner pair into said work space within an angle of 130° or less and said perception convergence means positioned with respect to said learner pair so as to focus their mutual perceptions toward the rear area of the work space angle thus formed.

2. A device as defined in claim 1 wherein said perception convergence means comprises a horizontal barrier member defining the lowermost boundary of said work space and at least one upright barrier panel for blocking external stimuli from said learner pair and for promoting control over interactive responses between learners.

3. A device as defined in claim 2 wherein said upright barrier panel is movable with respect to said horizontal member.

4. A device as defined in claim 1 wherein said perception convergence means comprises at least two upright barrier panels for converging the mutual perceptions of said learner pair and for blocking external stimuli and for promoting control over interactive responses between learners.

5. A device as defined in claim 4 wherein said upright barrier panels are movable with respect to one another.

6. A device as defined in claim 4 wherein said upright barrier panels converge to a common line and are connected to one another along one edge thereof at said common line.

7. A device as defined in claim 4 wherein said upright barrier panels are movable with respect to one another and with respect to said horizontal barrier member.

8. A device as defined in claim 1 wherein said perception convergence means comprises a horizontal barrier member defining the lowermost boundary of said work space and at least two upright barrier panels for blocking external stimuli and for promoting control over interactive responses between the learners of said learner pair.

9. A device as defined in claim 1 wherein said perception convergence means comprises a curvilinear, upright barrier panel for blocking external stimuli and for promoting control over interactive responses between learners.

10. A device as defined in claim 9 wherein a horizontal barrier member defines the lowermost boundary of said work space.

11. A device as defined in claim 9 wherein said perception convergence means comprises a horizontal barrier member defining the lowermost boundary of said work space, and a vertical adjustment means for supporting and holding said barrier panel in raised and lowered positions.

12. A device as defined in claim 11 including a support means for said horizontal barrier member, said support means stabilizing said barrier member against movement of said device by the learner pair.

13. A device as defined in claim 11 including a materials storage means connected to said horizontal barrier member.

14. A device as defined in claim 1 including a horizontal barrier member defining the lowermost boundary of said work space and wherein said horizontal barrier member has positional indicators on said barrier member for each learner of said learner pair whereby each learner of said pair has an indication of the position which he occupies with respect to the other learner for cross-synchronized learning activity.

15. A device to facilitate mutually interactive learning by at least one learner pair comprising a work space for said learner pair, said work space having means to accommodate a cross-synchronized stimulus field common to said learner pair, perception convergence means to focus the perception of each of the learners of said learner pair on a cross-synchronized stimulus field common to the learner pair, and learner positioning means integral with said device for controlling the relative positions of each of said learners with respect to each other and with respect to said perception convergence means.

16. A device as defined in claim 15 including a horizontal barrier member defining the lowermost boundary of said work space and wherein said positioning means comprises a pair of learner positioning indentations in the outer edge of said horizontal barrier member to position one learner each of said learner pair.

17. A device as defined in claim 16 wherein said positioning means includes a pair of learner seats affixed to said perception convergence means in such a manner that the positional axes defined by the centers of said seats and the mid-points of said positioning indentations intersect within the angle of 130° or less.

18. A perception convergence device to facilitate mutually interactive paired learning by a plurality of learner pairs comprising separate work spaces for each learner pair, each having means to accommodate separate cross-synchronized stimulus fields common to each pair of learners; and separate perception convergence means for each of said pairs of learners to focus the perception of each of said learner pairs separately on a common cross-synchronized stimulus field in order to fully specify the learning stimuli to each of said learner pairs and to exercise control over their interactive responses; said perception convergence means partially defining said separate work spaces for each learner pair and focusing the perceptions of each pair separately into their respective work spaces within an angle of 130° or less and said perception convergence means positioned with respect to each learner pair so as to focus their paired mutual perceptions toward the rear area of each work space angle thus formed.

19. A device as defined in claim 18 wherein said perception convergence means comprises a horizontal barrier member defining the lowermost boundary of said work space and at least one upright barrier panel for blocking stimuli between said plurality of learner pairs and for blocking external stimuli from each of said pairs and for promoting control over interactive responses between the learners of each of said learner pairs.

20. A device as defined in claim 19 wherein said horizontal barrier member is of circular configuration and three upright barrier panels are radially connected to the upper surface of said barrier member and are each interconnected by one edge thereof over the center portion of said barrier member and extend from the center portion outwardly to the edge portion of said barrier member.

21. A device as defined in claim 19 including two learner positioned means arranged along the outer edge of said horizontal barrier member for each of said learner pairs and two upright barrier panels, and each of said two learner positioning means and one of said cross-synchronized stimuli fields positioned within the area defined by said two upright barrier panels whereby one of said learner pairs have their mutual attention converged on said stimuli field to the exclusion of the other learner pairs and external stimuli and whereby control over the interactive responses of the learner pair positioned by said positioning means can be promoted.

22. A device as defined in claim 19 wherein said upright barrier member is movable with respect to said horizontal barrier member.

23. A device as defined in claim 19 wherein said upright barrier panel is vertically movable with respect to said horizontal barrier member and wherein a vertical adjustment means is provided for holding said barrier panel in raised and lowered positions.

24. A device as defined in claim 19 including a support means for said horizontal barrier member, said support means stabilizing said barrier member against movement of said device by the learner pairs.

25. A device as defined in claim 19 including a support means for said horizontal barrier member, said support means containing a materials storage means.

26. A device as defined in claim 18 including a horizontal barrier member defining the lowermost boundary of said work space and wherein said horizontal barrier member contains positional indicators for each learner of said learner pairs located on said barrier member whereby each learner of said learner pairs has an indication of the position which he should occupy with respect to the other leaner of his learner pair and with respect to the remaining learning pairs using said perception convergence device.

27. A device to facilitate mutually interactive learning by a plurality of learner pairs comprising a work space having means to accommodate separate cross-synchronized stimulus fields common to each pair of learners, separate perception convergence means for each of said pairs of learners to focus the perception of each of the learners of each of said learner pairs separately on a common stimulus field in order to fully specify the learning stimuli to each of said learner pairs, and learner positioning means integral with said device for controlling the relative positions of each of said pairs of learners with respect to each pair and for controlling the relative positions of each of said learners of each of said learner pairs with respect to each other and with respect to said separate perception convergence means.

28. A device as defined in claim 27 including a horizontal barrier member defining the lowermost boundary of said work space and wherein said positioning means comprises pairs of learner positioning indentations in the outer edge of said horizontal barrier member to accommodate one learner each of each of said learner pairs, each of said pairs of indentations being separated one from another and positioned in pairs within said separate perception convergence means.

29. A device as defined in claim 28 wherein said positioning means includes a pair of learner seats affixed to said perception convergence means for each of said learner pairs in such a manner that the positional axes defined by the centers of said seats and mid-point of each of said pair of positioning indentations intersect within the angle of 130° or less.

* * * * *